United States Patent [19]

Lin

[11] Patent Number: 4,760,774

[45] Date of Patent: Aug. 2, 1988

[54] ESPRESSO AND DRIP COFFEE MAKER

[75] Inventor: Sheng-Chi Lin, Kaohsiung Hsien, Taiwan

[73] Assignee: Tsann Kuen Enterprise Co., Ltd., Taiwan

[21] Appl. No.: 137,379

[22] Filed: Dec. 22, 1987

[51] Int. Cl.⁴ .......................... A47J 31/30; A47J 31/34
[52] U.S. Cl. ......................................... 99/299; 99/281; 99/302 R; 99/305; 99/306; 99/307
[58] Field of Search ............... 99/279, 293, 295, 299, 99/300, 302 R, 304, 305, 306, 307, 280, 281, 282, 283; 426/433

[56] References Cited

U.S. PATENT DOCUMENTS

| | | | |
|---|---|---|---|
| 4,083,295 | 4/1978 | Hollingsworth | 99/293 |
| 4,460,819 | 7/1984 | Eugster | 99/300 |
| 4,506,597 | 3/1985 | Karns | 99/295 |
| 4,508,023 | 4/1985 | Naya | 99/279 |
| 4,674,400 | 6/1987 | Rondel | 99/279 |

Primary Examiner—Robert W. Jenkins
Attorney, Agent, or Firm—Ladas & Parry

[57] ABSTRACT

An espresso and drip coffee maker has a body on which a hanging member is mounted. The hanging member may be rotated to an operative position for hanging removably a coffee bean container on an upper portion of the body. The body includes a water container, a conduit, and an accumulating chamber therein. A two-way valve is provided for guiding the water in the water container through either the conduit or the accumulating chamber into a steam chamber which is communicated with the coffee bean container. A heating pipe is interposed between the conduit and the accumulating chamber for providing heat to the conduit and the accumulating chamber. A check valve is provided for preventing water or steam from flowing back to the water container through the conduit.

4 Claims, 5 Drawing Sheets

ESPRESSO AND DRIP COFFEE MAKER

BACKGROUND OF THE INVENTION

The invention relates to a coffee maker, and more particularly to an espresso and drip coffee maker.

Coffee makers are classified into espresso coffee makers and drip coffee makers. In recent years, espresso and drip coffee makers have been developed to meet the needs of consumers. However, a conventional espresso and drip coffee maker is merely an aggregation of an espresso coffee maker and a drip coffee maker, resulting in a bulky device.

SUMMARY OF THE INVENTION

It is therefore the main object of this invention to provide a compact espresso and drip coffee maker.

According to this invention, an espresso and drip coffee maker has a body on which a coupling means is provided for mounting removably a coffee bean container on the body. A water container is mounted fixedly on the body and includes a cover mounted removably thereon. A conduit is mounted fixedly on the body and is communicated with the water container for the passage of water from the water container therethrough. An accumulating chamber is formed in the body and is communicated with the water container for the passage of water from the water container therethrough. A heating means is interposed between the conduit and the accumulating chamber for providing heat to the conduit and the accumulating chamber. A two-way valve is mounted between the water container and the conduit and between the water container and the accumulating chamber for guiding water flowing from the water container into either the conduit or the accumulating chamber. A steam chamber is formed in the body so as to communicate with the coupling means, the conduit and the accumulating chamber. A check valve is provided for preventing water or steam from flowing back into the water container through the conduit.

When water is guided to flow through the conduit and the steam chamber into the coffee bean container, drip coffee will be brewed.

When water is guided to flow through the accumulating chamber and the steam chamber into the coffee bean container, espresso coffee will be brewed.

BRIEF DESCRIPTION OF THE DRAWINGS

Other features and advantages of this invention will become apparent in the following detailed description of a preferred embodiment of this invention with reference to the accompanying drawings in which.

DETAILED DESCRIPTION OF THE PREFERRED EMBODIMENT

Figure 1:
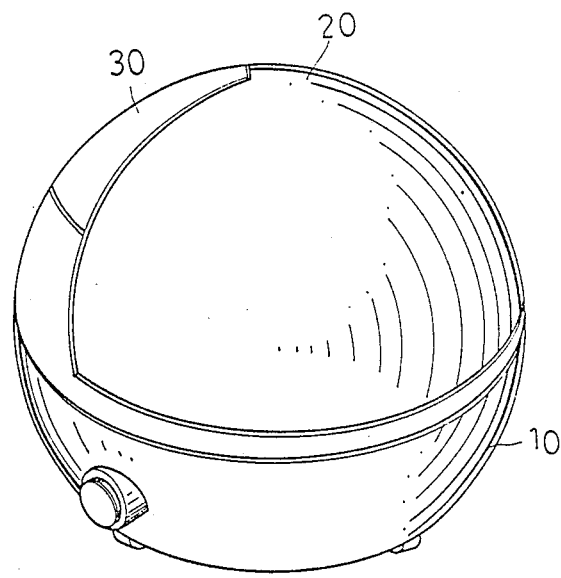
FIG. 1 is a perspective view of a compact espresso and drip coffee maker according to this invention when it is idle.
Figure 2:
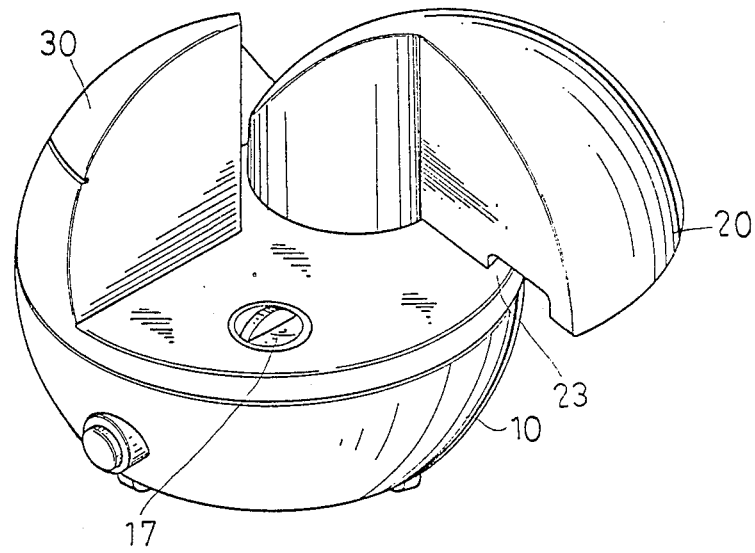
FIG. 2 is a perspective view showing the coffee maker of this invention in which a hanging member is rotated to its operative position.

Referring to FIG. 1, a compact spherical espresso and drip coffee maker includes a body 10, a rotatable hanging member 20, and a removable cover 30. The hanging member 20 may be rotated to its operative position shown in FIG. 2.

Figure 3:
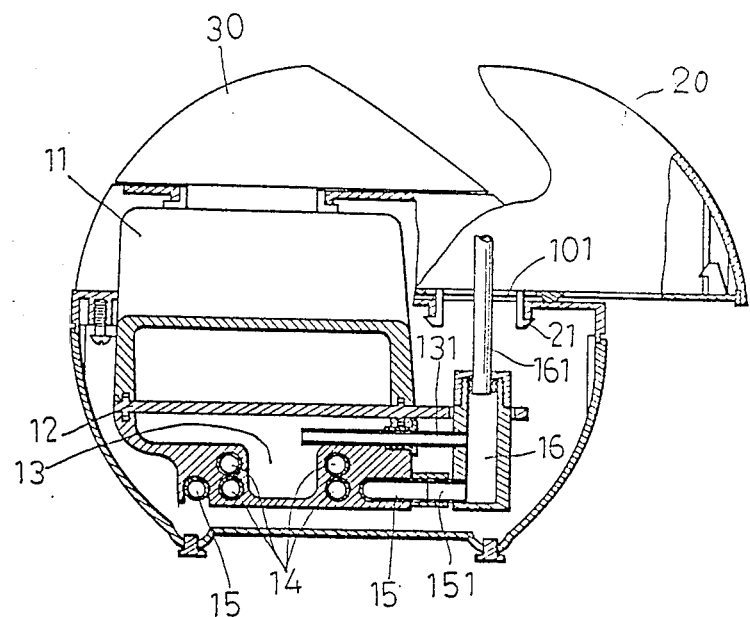
FIG. 3 is a sectional view showing the coffee maker of this invention when it is in the position shown in FIG. 2.

Referring to FIG. 3, a water container 11 is fixed within the body 10. As illustrated, the hanging member 20 is formed with four equally spaced flexible barbs 21 (only two are shown) for being mounted rotatably on an aperture 101 in the water container 11. The interior of the water container 11 is divided into an upper reservoir and an accumulating bottom chamber 13 by a partition 12. A generally U-shaped water conduit 15 (see FIG. 10) of aluminum is fixed in the water container 11 around the accumulating chamber 13. A heating pipe 14 (see FIG. 10), which makes a loop around the accumulating chamber 13, is interposed between the accumulating chamber 13 and the water conduit 15 for providing heat for them. The heating pipe 14 is connected to a power cord (not shown).

Figure 4:
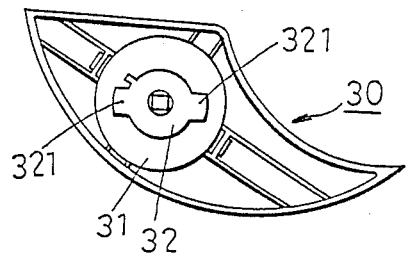
FIG. 4 is an elevational bottom view showing a cover of the coffee maker according to this invention.
Figure 5:
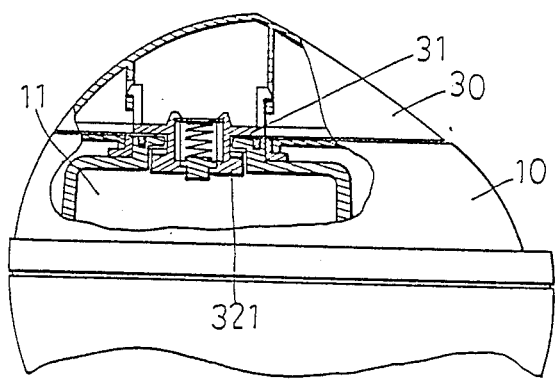
FIG. 5 is a schematic view illustrating how to mount the cover onto the body of the coffee maker in accordance with this invention.

Referring to FIGS. 4 and 5, the cover 30 has a circular covering plate 31. A plug 32 projects downwardly from the center of the covering plate 31 into the upper opening of the water container 11. The plug 32 is formed at its end with two laterally extending arms 321 which are obstructed by an inwardly directed flange formed on the upper open end of the water container 11. It is understood that the inwardly directed flange has two opposed cut-outs (not shown) which allow the removal of the projecting arms 321 from the water container 11 therethrough.

Figure 6:
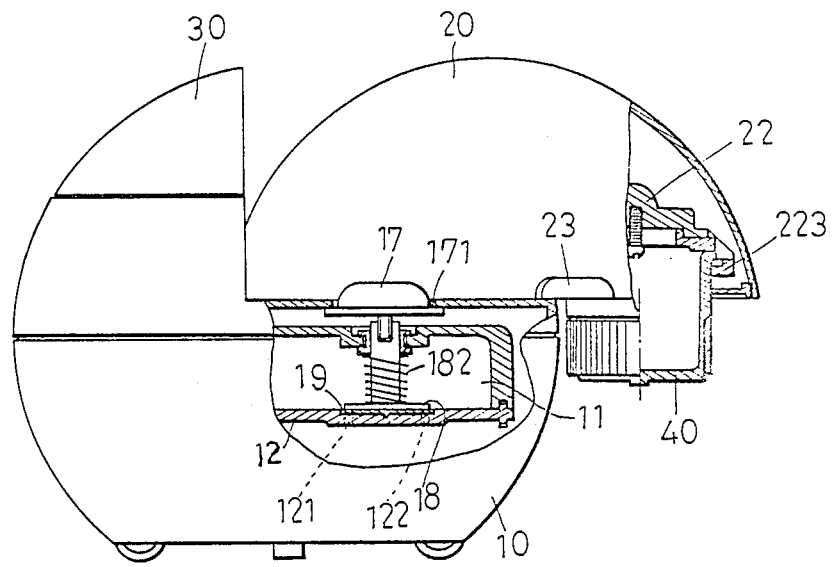
FIG. 6 is a schematic sectional view illustrating a two-way valve of the coffee maker according to this invention.
Figure 7:
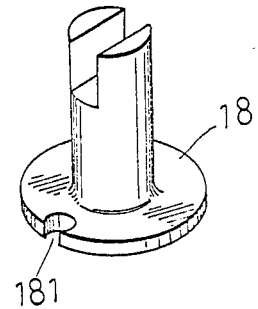
FIG. 7 is a perspective view showing the two-way valve of this invention.

Referring to FIG. 6, a two-way valve 18 is provided for selectively guiding the water flowing from the reservoir to either the accumulating chamber 13 or the water conduit 15. The partition 12 has two parallel through holes 121 and 122. The valve 18 is pressed downwardly by a spring 182 so as to rest on the partition 12. A cushion 19 is provided between the valve 18 and the partition 12. A notch 181 (see FIG. 7) is formed in the disk part of the valve 18. The valve 18 is controlled by a rotary knob 17 (see FIGS. 2, 6, and 8). When the notch 181 in the valve 18 is rotated to register with the through hole 121, water will flow from the reservoir of the water container 11 to the water conduit 15. Conversely, when the notch 181 in the valve 18 is rotated to register with the through hole 122, water will flow from the reservoir of the water container 11 to the accumulating chamber 13.

Again referring to FIG. 3, a cylinder is fixed in the water container 11 for forming a steam chamber 16 therein. The steam chamber 16 is communicated with the accumulating chamber 13 by a first steam conduit 131, with the water conduit 15 by a second steam conduit 151 which is parallel to the first steam conduit 131, and with the interior of the hanging member 20 by a third steam conduit 161. Then referring to FIGS. 8 and 9, the third steam conduit 161 takes a bend of 90 degrees in the hanging member 20 to engage with a large-diameter conduit 221 which is fixed on a coupling unit 22. The coupling unit 221 is formed at its lower end edge 222 with three equally spaced grooves 223 so that a coffee bean container 40 (see FIG. 6), which has a filtering means (not shown), may be temporarily retained on the hanging member 20 when the hanging member 20 is rotated to its operative position. As illustrated, the coffee bean container 40 is formed at its upper end with an outward flange which can be inserted into the lower end edge 222 of the coupling unit 221 and then rotated to a locked position.

Figure 8:
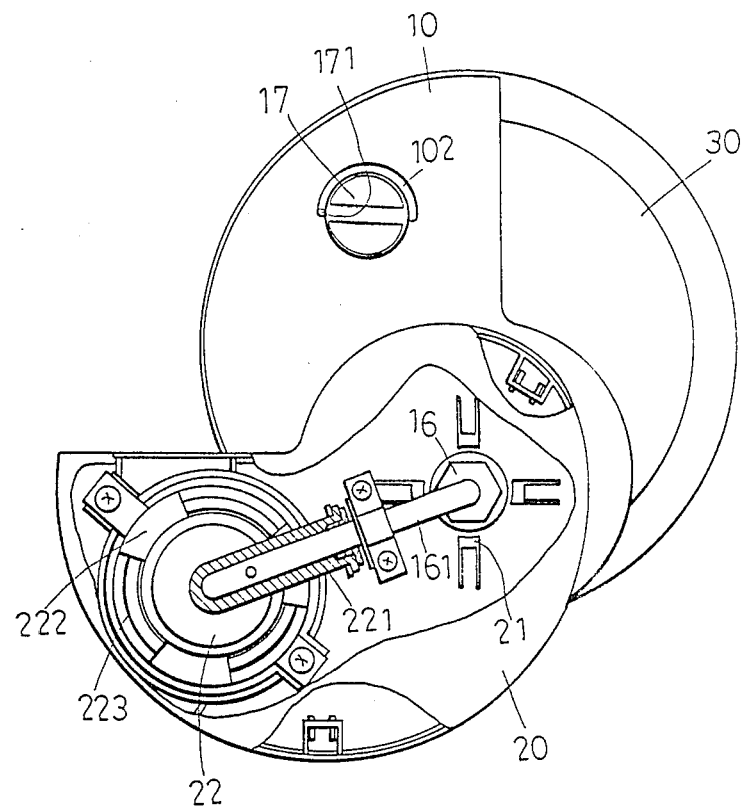
FIG. 8 is a schematic top view illustrating the hanging member of the coffee maker according to this invention.
Figure 9:
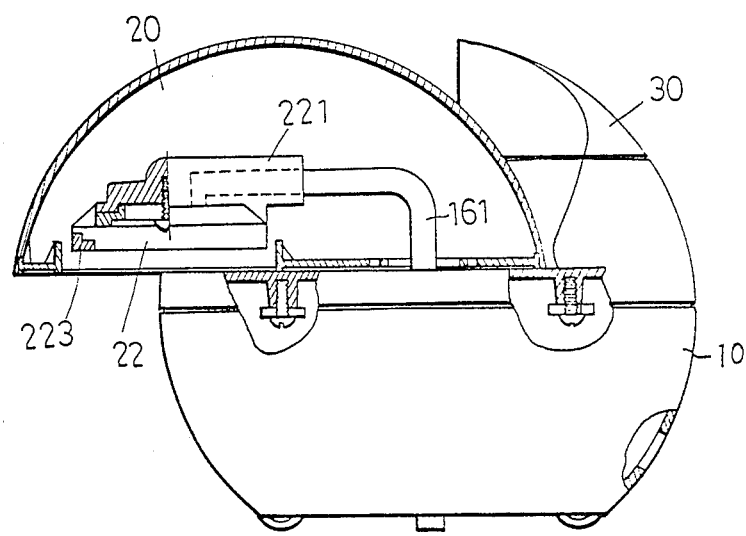
FIG. 9 is a schematic rear view illustrating the hanging member of the coffee maker according to this invention.

The hanging member 20 has in its bottom surface a slot 23 (see FIGS. 2 and 6) which is arcuated to engage with the rotary knob 17 even when the hanging member 20 is rotated. Referring to FIG. 8, to adjust the rotary knob 17 to two limited positions, the rotary knob 17 is formed with a bump 171 at its edge, while the upper wall of the body 10 is oppositely formed with a semicircular slot 102 for confining the bump 171 therein.

Figure 10:
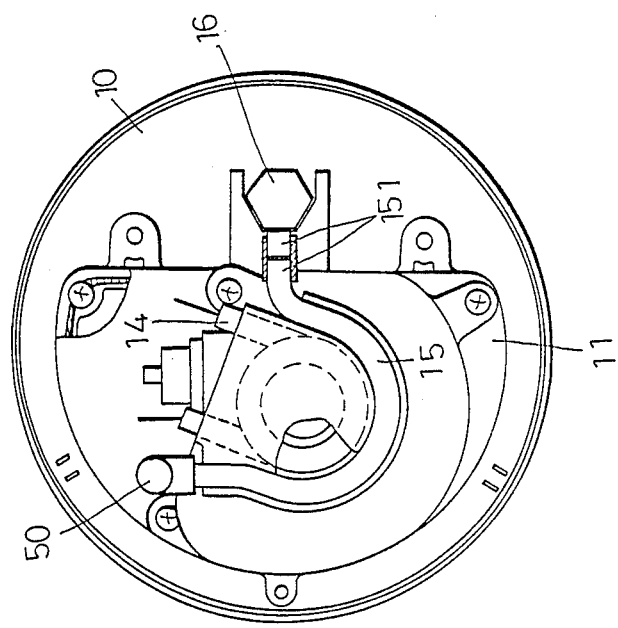
FIG. 10 is a schematic view illustrating how a water conduit is mounted on the coffee maker in accordance with this invention.
Figure 11:
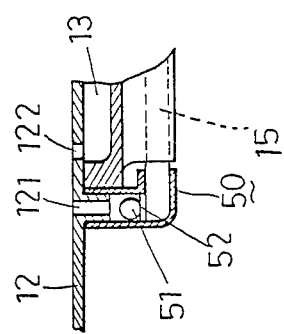
FIG. 11 is a schematic view illustrating how a check valve is mounted on the coffee maker in accordance with this invention.

Referring to FIG. 10, the water conduit 15 is connected to the second steam conduit 151 at an end thereof, as described above. Between the other end of the water conduit 15 and the partition 12, a check valve 50 is provided for preventing water or steam from flowing back to the through hole 121 through the water conduit 15. The check valve 50, as shown in FIG. 11, includes a ball 51 which is confined in a region near the lower end of the through hole 121 by a grid plate 52.

In use, the cover 30 is removed from the body 10 so that raw water can be poured into the water container 10. The hanging member 20 is then rotated to its operative position so that the coffee bean container 40 can be retained thereon. After the heating pipe 14 has been powered, the knob 17 can be adjusted to make espresso or drip coffee.

To make drip coffee, the notch 181 is rotated to register with the through hole 121 in the partition 12 so that the water in the water container 11 flows into the water conduit 15. The water in the water conduit 15 will be vaporized to pass through the steam conduit 151 into the steam chamber 16. The steam in the steam chamber 16 almost entirely flows through the third steam conduit 161 into the coffee bean container 40. Only a very small percentage of the steam in the steam chamber 16 will flow through the first steam conduit 131 into the accumulating chamber 13.

To make espresso coffee, the notch 181 is rotated to register with the through hole 122 in the partition 12 so that the water in the water container 11 flows into the accumulating chamber 13. The water in the accumulating chamber 13 will be heated and vaporized to accumulate in the top of the water container 11. The pressure and temperature of the steam in the top of the water container 11 will increase and thus flow through the first steam conduit 131, the steam chamber 16 and the third steam conduit 161 and into the coffee bean container 40. Similarly, a small amount of steam can flow through the steam chamber 16 into the water conduit 15.

It can be understood that the espresso and drip coffee maker of this invention is compact. The object of this invention is thus achieved.

With this invention thus explained, it is apparent that numerous modifications and variations can be made without departing from the scope and spirit of this invention. It is therefore intended that this invention be limited only as indicated in the appended claims.

I claim:

1. An espresso and drip coffee maker comprising:
   a body including a coupling means provided thereon for mounting removably a coffee bean container on said body;
   a water container mounted fixedly on said body and including a cover mounted removably thereon;
   a conduit mounted fixedly on said body and communicated with said water container for passage of water from said water container therethrough;
   a first heating means for providing heat to said conduit;
   an accumulating chamber formed in said body and communicated with said water container for passage of water from said water container therethrough;
   a second heating means for providing heat to said accumulating chamber;
   a two-way valve mounted between said water container and said conduit and between said water container and said accumulating chamber for guiding water flowing from said water container into either said conduit or said accumulating chamber;
   a steam chamber, formed in said body, communicated with said coffee bean container and with said conduit and with said accumulating chamber; and
   a check valve for preventing water or steam from flowing back to said water container through said conduit.

2. An espresso and drip coffee maker as claimed in claim 1, wherein said coupling means includes a hanging member mounted rotatably on an upper portion of said body, said hanging member being capable of being rotated in a horizontal plane to hang said coffee bean container thereon.

3. An espresso and drip coffee maker as claimed in claim 1, wherein said first heating means includes a heating pipe interposed between said conduit and said accumulating chamber.

4. An espresso and drip coffee maker as claimed in claim 1, wherein said second heating means includes a heating pipe interposed between said conduit and said accumulating chamber.

* * * * *